(12) United States Patent
De Groot

(10) Patent No.: US 11,858,182 B2
(45) Date of Patent: Jan. 2, 2024

(54) PRESS FOR IN-SITU MANUFACTURING A THERMOPLASTIC SANDWICH PANEL

(71) Applicant: FITS HOLDING B.V., Driebergen (NL)

(72) Inventor: Martin Theodoor De Groot, Driebergen (NL)

(73) Assignee: FITS HOLDING B.V., Driebergen-Rijsenburg (NL)

( * ) Notice: Subject to any disclaimer, the term of this patent is extended or adjusted under 35 U.S.C. 154(b) by 408 days.

(21) Appl. No.: 17/296,344

(22) PCT Filed: Dec. 2, 2019

(86) PCT No.: PCT/NL2019/050795
§ 371 (c)(1),
(2) Date: May 24, 2021

(87) PCT Pub. No.: WO2020/117048
PCT Pub. Date: Jun. 11, 2020

(65) Prior Publication Data
US 2022/0097265 A1 Mar. 31, 2022

(30) Foreign Application Priority Data
Dec. 3, 2018 (NL) .................................. 2022113

(51) Int. Cl.
*B29C 44/14* (2006.01)
*B29C 44/06* (2006.01)
(Continued)

(52) U.S. Cl.
CPC .............. *B29C 44/14* (2013.01); *B29C 44/06* (2013.01); *B29C 44/10* (2013.01);
(Continued)

(58) Field of Classification Search
CPC ......... B29C 44/14; B29C 44/06; B29C 44/10; B29C 44/3415; B29C 44/44;
(Continued)

(56) References Cited

U.S. PATENT DOCUMENTS

| 3,818,085 A | 6/1974 | Marsland, Jr. et al. |
| 2005/0053691 A1* | 3/2005 | Gabriel ............... B29C 45/7312 425/810 |
| 2010/0089517 A1* | 4/2010 | Zhang .................. B21C 37/154 156/356 |

FOREIGN PATENT DOCUMENTS

| WO | 2015/065176 A1 | 5/2015 |
| WO | 2017/010872 A1 | 1/2017 |

OTHER PUBLICATIONS

International Search Report and Written Opinion for WO 2020/117048 (PCT/NL2019/050795), dated Feb. 13, 2020, pp. 1-9.

* cited by examiner

Primary Examiner — Nahida Sultana
(74) Attorney, Agent, or Firm — Thomas|Horstemeyer, LLP

(57) ABSTRACT

A press (10) for manufacturing a sandwich panel comprises a first and second press plate (12; 14) that are movable with respect to one another. The press (10) has a fluid circulation loop for heating and cooling the press plates (12; 14). The fluid circulation N loop comprises a heater (22) for generating a hot fluid connected to a fluid supply conduit (24) in fluid communication with an inlet (18) of at least one internal flow channel (16) in each press plate (12; 14) and connected to a fluid return conduit (26) in fluid communication with an outlet (20) of the at least one internal flow channel (16). The fluid circulation loop is also provided with (Continued)

Figure 1:
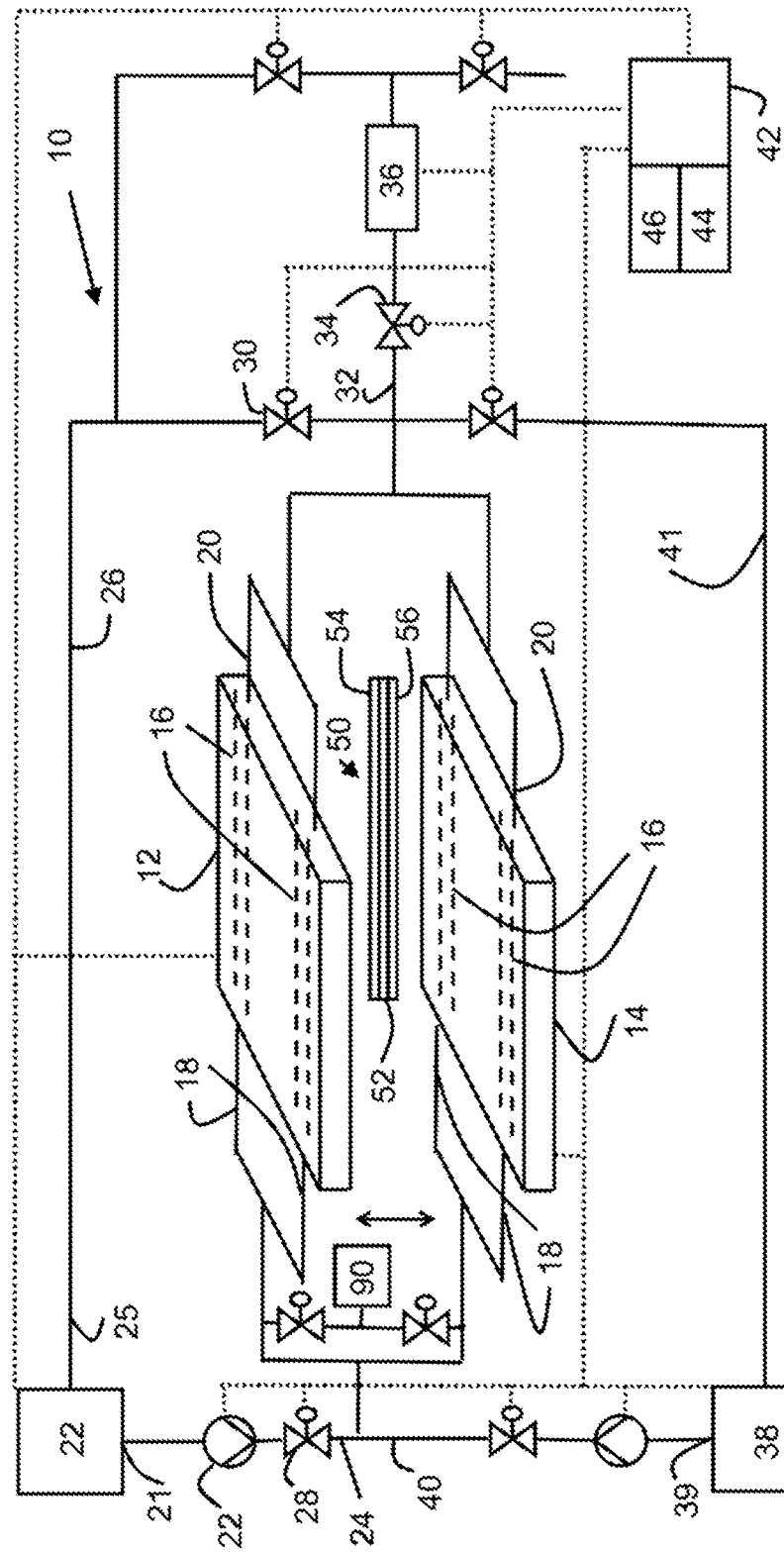

a controlled expansion valve (34) for cooling by conversion of hot pressurized water into steam, and a water source (38) for slow cooling.

20 Claims, 2 Drawing Sheets

(51) Int. Cl.
| | |
|---|---|
| *B29C 44/10* | (2006.01) |
| *B29C 44/34* | (2006.01) |
| *B29C 44/44* | (2006.01) |
| *B30B 15/06* | (2006.01) |
| *B32B 5/20* | (2006.01) |
| *B32B 27/06* | (2006.01) |
| *B29L 7/00* | (2006.01) |

(52) U.S. Cl.
CPC .......... *B29C 44/3415* (2013.01); *B29C 44/44* (2013.01); *B30B 15/064* (2013.01); *B32B 5/20* (2013.01); *B32B 27/065* (2013.01); *B29L 2007/002* (2013.01)

(58) Field of Classification Search
CPC ..... B29C 35/049; B29C 35/16; B30B 15/064; B32B 5/20; B32B 27/065; B32B 2038/0084; B32B 2305/07; B32B 37/06; B32B 37/08; B32B 41/00; B29L 2007/002; B29D 99/001
See application file for complete search history.

PRESS FOR IN-SITU MANUFACTURING A THERMOPLASTIC SANDWICH PANEL

CROSS-REFERENCE TO RELATED APPLICATIONS

This application is the National Stage of International Application No. PCT/NL2019/050795, filed Dec. 2, 2019, which claims priority to NL 2022113, filed Dec. 3, 2018, which are entirely incorporated herein by reference.

The present invention relates to a press for in-situ manufacturing a thermoplastic sandwich panel comprising at least a foam core and at least one skin layer.

In-situ manufacturing of sandwich panels from a starting structure is known in the art. E.g. EP636463 discloses such a method. In-situ manufacturing according to EP636463 involves at least the steps of providing a starting structure comprising a core layer of a thermoplastic wherein a physical blowing agent, in particular a swelling agent, is incorporated, covered at least at one surface with a skin layer. Typically the core layer is arranged between two skin layers, advantageously fibre-reinforced thermoplastic skin layers. The starting structure is positioned in a heated press between a bottom press plate and a top press plate. The press is subsequently closed and the press plates exert a pressure on the starting structure. The starting structure is heated to the foaming temperature (above the boiling temperature of the swelling agent) of the thermoplastic, while continuing to apply pressure on the starting structure to prevent premature foaming. Upon heating adhesion between the core layer and the skin layers occurs by the thermoplastic. Once the foaming temperature is reached, foaming is performed by moving the press plates apart to a predetermined distance in a controlled way, allowing the thermoplastic of the core layer to expand and foam cells to be formed by the physical blowing agent. Thus foaming and adherence occur in the same press. Pressure is maintained on the structure now foamed and the press plates are cooled. When sufficiently cooled so that no further foaming occurs, typically below the boiling temperature of the swelling agent, e.g. ambient temperature, the pressure may be fully relieved and the sandwich panel thus obtained can be removed from the press. In manufacturing a thermoplastic sandwich panel with a physical blowing agent, fast cooling is required in order to prevent collapse of the foam, in particular at the interface of the foam and skin layers, as well as to prevent further migration of the physical blowing agent into the thermoplastic of the fibre-reinforced thermoplastic skins, if present.

In case of a chemical blowing agent as described in WO2015/065176A1 the starting structure is placed in a heated press, which has been heated to a temperature well above the melting temperature or range of the thermoplastic in the core. The chemical blowing agent in the core layer is decomposed, after which the intermediate structure obtained is cooled down to a temperature typically just above the melting temperature of the respective thermoplastic of the core layer in an intermediate cooling step. Subsequently foaming is performed by moving the press plates apart in a controlled way and when the required predetermined foaming thickness is reached the press plates are cooled down further.

For productivity reasons the various process steps of heating, foaming and cooling should be fast, e.g. in the range of tens of seconds to at most a few minutes, as well as homogeneous, in particular during cooling, in order to prevent significant temperature differences over the press plates, which might affect the quality of the final sandwich panel. Fast cooling is also necessary to prevent after-foaming and in particular collapse of the cells formed, which would seriously affect the mechanical properties of the sandwich panel thus obtained, In a press used today for manufacturing a thermoplastic sandwich panel using a physical blowing agent, the press plates are heated by circulating steam through internal flow channels that are provided in the press plates. Cooling is done by flowing water through the internal flow channels, that are typically positioned in a counter flow arrangement, in the press plates.

It has appeared that cooling with cold water in such a press may be insufficient for several reasons. Firstly, the cooling capacity of this press is at its maximum, which may result in a too low cooling rate. Furthermore a significant temperature difference has been observed over the dimensions of the press plates, due to the length of the internal water flow channels in the press plates, heat conductivity of the press plates and the high cooling rate that is required in general. These temperature differences may result in locally varying density of the foamed core of the sandwich, rupture and/or dissolution of cell walls due to induced streams of the physical blowing agent through the cell walls and at the interface of the foam and skins, as well as in locally varying cell dimensions, which reflect themselves in locally differing mechanical properties and appearance. Thus the quality of the final sandwich panel thus obtained leaves something to be desired.

Therefore an object of the invention is to improve the homogeneity of the temperature over the surfaces of the press plates, in particular during a primary stage of cooling.

According to the invention a press for manufacturing a sandwich panel, is provided, that comprises a first and second press plate that are configured to be movable with respect to one another, the press having a fluid circulation loop for heating and cooling the press plates, wherein the fluid circulation loop comprises a heater for generating a heated fluid, having an outlet connected to a fluid supply conduit, and an inlet connected to a fluid return conduit, wherein the fluid supply conduit is in fluid communication with an inlet of at least one internal flow channel in each press plate and the fluid return conduit is in fluid communication with an outlet of the at least one internal flow channel of each press plate, wherein the fluid circulation loop is provided with a controlled expansion valve configured for conversion of hot pressurized water into steam for cooling the press plates, and a water source of which the outlet is in fluid communication with the inlets of the internal flow channel of each press plate via a water supply conduit.

The press according to the invention comprises press plates (sometimes also referred to as press tools), that can be moved with respect to one another, typically a bottom press plate and a top press plate that are arranged above each other and that can perform a movement in a vertical direction. Typically one or both of the press plates have a cavity wherein a starting structure for the sandwich can be positioned. Generally the periphery of the cavity engages the periphery of the starting structure such that during the controlled foaming stage only expansion in the thickness (vertical) direction can occur. The press according to the invention has a heating and cooling system. The heating system comprises a heater for generating a heated fluid, such as hot pressurized water, e.g. an electrical heater, boiler or other heat exchanger to heat water to the required temperature (range) provided with a suitable pump to pressurize the water. Steam can also be used for heating the press plates. The heater is connected to the inlet end of the flow channel in each press plate via a fluid supply conduit and to the outlet ends of the flow channel via a return conduit. Typically the press plates will have a plurality of flow channels that are provided with suitable manifolds at their ends for connection to the fluid supply conduit and the fluid return conduit respectively. For heating the press plates, the heater prepares hot water under pressure or steam and the hot fluid is circulated from the heater to the flow channels in the press plates via the supply conduit and from the press plates via the return conduit back to the heater. Temperature and pressure of the hot water or steam as supplied are generally in the range of 170-190° C. and 8-13 bar respectively. Advantageously the distribution of the flow channels in the body of the press plates and in operation the flow rate through every channel of both press plates is such that a homogeneous temperature (distribution) of the inner faces of press plate is achieved. For cooling purposes the press according to the invention utilizes the heat of evaporation that is required for conversion of the hot pressurized water in the internal flow channel system of the press into steam. If steam has been used for heating the press, than hot pressurized water is introduced e.g. using a venturi connection prior to cooling, such that the internal flow channels contain hot pressurized water. In view of this type of cooling the circulation loop is provided with a controlled expansion valve allowing to convert the hot pressurized water into steam, after shutting down the flow of pressurized hot water through the flow channels in the press plates. The heat of evaporation required for this conversion is withdrawn from the press plates. The press plates cool the foamed structure. It has appeared that the withdrawal of heat from the press plates by this conversion into steam is more uniform than in cooling with cold water, but still fast enough to allow the required cooling rates. It has also appeared that the uniform cooling results in press plate surfaces having a more homogeneous temperature over the surface resulting in less local varying density and cell dimensions in the final sandwich panel. Thus the quality of the sandwich panel is improved. Another advantage is that the cooling conditions can be adjusted accurately according to the requirements, e.g. according to a cooling curve showing different cooling rates in the cooling stage. E.g. the cooling rate at the start of the cooling state can be slower than at a later moment, where faster cooling is desired. Cooling conforming to such a cooling curve can have a positive effect on the condensation behaviour of the physical blowing agent and as a result on the foam structure. Cooling by means of evaporation is performed until a predetermined temperature is reached, such as well below the foaming temperature of the thermoplastic of the foamed core. Since the effect of the heat of evaporation is reduced when a temperature below a certain temperature, e.g. below 150° C., such as in the range of 140-110° C., is reached, further cooling is performed by flows of water with gradually decreasing controlled temperatures, for example water temperatures of 40-90° C. in order to maintain a fast cooling rate and maintain the homogeneity of the temperature over the press plates. After this intermediate cooling step using temperature controlled water, further slow cooling to ambient temperature can be performed using an appropriate flow of temperature controlled water through the press plates. This slow cooling is less critical for the development of the final properties of the sandwich panel. Homogeneity of the temperature over the press plates is preferably maintained by a significant flow of water through the internal flow channels. Typically the temperature of the press plate (e.g. at a position just (a few mm such as 4 mm) below its face) is measured and used as a control parameter for adjusting the water temperature.

In another embodiment the pressure in the flow channels is reduced on purpose in addition to the pressure reduction due to steam formation, when the effect of the heat of evaporation becomes smaller. The additional pressure reduction, such as applying a (partial) vacuum using a vacuum pump connected to the flow channels, results in a decrease of the temperature at which steam formation occurs. This would allow to continue the cooling by phase transformation of water into steam down to a lower temperature, e.g. less than 90° C., compared to the above range of 140-110° C., offering a more homogeneous temperature of the press plates. After this intermediate cooling step further slow cooling can be performed as described above.

If the volume of hot pressurized water in the flow channels becomes too small and is insufficient for the required cooling by phase transformation, additional, preferably hot pressurized water can be introduced in the flow channels. This make-up may be performed during the cooling operation, or during a brief interruption thereof.

In an advantageous embodiment a conduit having the controlled expansion valve is connected to a condenser for recovery of heat from the generated steam. The (low-pressure) steam generated during cooling contains energy which can easily be recovered in the condenser. The generated steam can also be utilized as such e.g. as process heat in other industrial processes.

The press operation is typically controlled using a PLC or PC. In an embodiment the controller comprises a processor and a memory storing computer-readable instructions which, when executed by the processor, perform processes, including:

pre-heating the press plates by flowing a hot fluid through the fluid circulation loop;
  closing the press by moving the pre-heated press plates towards one another and exerting a pressure on a starting structure of the sandwich panel to be manufactured;
  continuing heating the press plates by flowing a hot fluid through the fluid circulation loop thereby heating the starting structure to the foaming temperature, while exerting a pressure on the starting structure;
  foaming the starting structure at the foaming temperature by moving the press plates a predetermined distance apart, while maintaining a pressure on the structure being foamed;
  interrupting the flow of hot fluid through the fluid circulation loop;
  cooling the press plates by actuating the controlled expansion valve thereby converting hot pressurized water into steam; and
  cooling the press plates by flowing water having a controlled temperature through the internal flow channels of the press plates.

Typically also opening of the press in order to allow removal of the sandwich panel as produced is comprised in the instructions.

Advantageously the press is provided with a feed unit for introducing the starting structure in the press instead of manually arranging the starting structure in the press and/or a discharge unit for unloading the sandwich panel as produced from the press. Then the instructions additionally comprise introducing the starting structure in the press, and if applicable, removing the sandwich panel as manufactured from the press.

The above instructions are typical for manufacturing a sandwich panel using a physical blowing agent. A physical blowing agent is a swelling agent (i.e. a solvent having low solvability in the respective thermoplastic) or solvent that upon heating volatilizes and the gas bubbles obtained create the foam cells. Examples of physical blowing agents include carbon dioxide and light hydrocarbons such as various pentanes, and swelling agents like acetone and solvents like methylene chloride.

For thermoplastic sandwich panels manufactured with a chemical blowing agent, e.g. as described in WO2015/065176A1, a fast and homogeneous cooling from the decomposition temperature (or higher) of blowing agent to the foaming temperature, as well as from the foaming temperature to a temperature below Tg or Tm of the thermoplastic in the foam core of the thermoplastic sandwich panel is advantageous in order to reduce cycle times. In this way the optimum temperatures or ranges for decomposition and those for foaming can be selected and set independently.

A chemical blowing agent is a compound that upon decomposition forms low molecular gases like nitrogen, carbon dioxide, carbon monoxide, oxygen, ammonia and the like. Examples of chemical blowing agents include azobisisobutyronitrile, diazoaminobenzene, mononatriumcitrate and oxybis(p-benzenesulfonyl)hydrazide. Azo-, hydrazine and other nitrogen based chemical blowing agents are preferred. Azodicarbonamide is a preferred example of this category. Other examples include isocyanate for PU and sodium bicarbonate. A core layer of the first thermoplastic comprising a chemical blowing agent can be easily manufactured, e.g. by extrusion or calendaring.

The invention can be used for either type of blowing agent. However, manufacture of a sandwich panel as explained above using a physical blowing agent, in particular a swelling agent, gain the most profit from the press according to the invention.

As a starting structure a core layer of a thermoplastic comprising the blowing agent in combination with at least one skin layer is used.

Thermoplastics, which are suitable for the core layer to be foamed using a physical blowing agent comprise both the crystalline and amorphous thermoplastics. Amorphous thermoplastics are preferred in view of solvability.

Thermoplastics which are suitable for the core layer to be foamed using a chemical blowing agent comprise both the crystalline and amorphous thermoplastics. Crystalline thermoplastics are preferred, as the difference between the glass transition temperature and melting point is small, offering the possibility of consolidating the thermoplastic once foamed within a small temperature interval.

As a material for the skin layers (also called covers or face sheets) thermoplastics, in particular fibre-reinforced thermoplastics, and metal sheets, e.g. aluminium, can be used. The bottom and top cover layers are preferably made from the same material, but combinations, e.g. a bottom cover layer of a metal like aluminium and a top cover layer of a (fibre-reinforced) thermoplastic are also contemplated. The selection of the materials for the core layer and the skins is inter alia dependent on the desired properties of the final product application.

The thermoplastics for the core layer and the cover layers may be the same or different, including different grades. Hereinafter, for indication purposes the thermoplastic in the core layer is indicated as first thermoplastic, while the thermoplastic in a cover layer, if any, is referred to as second thermoplastic. Examples include polyetherimide (PEI), polyethersulfone (PES), polysulfone (PSU), polyphenylsulfone (PPSU), polyketone such as polyetheretherketone (PEEK), PPS polyphenylene sulphide, liquid crystal polymers, polycarbonate (PC), polyolefines (obtained from C1-C4 monomers) like polyproplene (PP), polyvinylchloride (PVC), polyethylene (PE), thermoplastic polyurethane (TPU), PA polyamide, PC poly carbonate, etc., as well as combinations thereof. Combinations of different cover layers, such as PEI/PEEK, PPSU/PEEK and PEI/PC are also conceivable. Thermoplastic biopolymers are also contemplated. A skin may comprise one or more sublayers, the number of which may vary locally, e.g. in view of locally dedicated additional enforcement. In case of locally differing skins the heat transfer properties, like heat capacity and/or thermal conductivity, typically also differ locally. Then the press may be equipped with non-adherent local compensation parts which equalize the heat transfer properties.

Advantageously at least one of the skins is a fibre-reinforced layer of a second thermoplastic. Preferably both skins are fibre-reinforced layers of the second thermoplastic.

As indicated above, combinations of different thermoplastics for the first and second thermoplastics can also be used. Examples comprise, inter alia, PEI for the at least one core layer covered with (fibre-reinforced) skins made from PPSU, PS, PEEK or PC; PES or PPSU for the at least one core layer covered with (fibre-reinforced) cover layers made from PSU (polysulphone) or PC; and PP for the at least one core layer covered with (fibre-reinforced) layers made from polyamide, such as nylon.

In view of compatibility advantageously the type of the first thermoplastic is equal to the type of the second thermoplastic.

Glass fibres are the preferred means of reinforcement. Other inorganic fibres, such as metal fibres, carbon fibres, and organic fibres such as aramid fibres, polymeric fibres, nano fibres of the aforementioned fibres and natural fibres can be used in the same manner, provided that they can withstand the temperature that they are subjected to during the operation of the method according to the invention. The fibres can be used in the form of mats, fabrics, chopped fibres and the like. Directional fibres, in particular unidirectional fibres, in which the fibre direction has been adapted to suit the intended use, can also be used advantageously. High strength, high elongation steel cords, may be present in the fibre-reinforced cover layers.

Reinforcement can also be applied between sublayers of the core layer of a thermoplastic wherein a chemical or physical blowing agent, in particular a swelling agent, is incorporated. Examples of such a reinforcement comprise (glass) fibre-reinforced layers, metal layers, steel cords.

Another preferred embodiment for the starting structure is a mat made of both inorganic fibres and thermoplastic fibres, e.g. a mat manufactured from glass fibres and propylene fibres or inorganic fibres and thermoplastic powders.

Additives, like nucleating agents, plasticizers, melt strength improvers and nanoparticles may also be present in the first thermoplastic layer.

The press plates of the press according to the invention may have flat surfaces. It is also contemplated that one or both of the press plates have a 2D or 3D curved surface configuration.

The invention also relates to a method of manufacturing a sandwich panel in a press having press plates, which sandwich panel comprises at least one foam layer of a first thermoplastic and cover layers, the method comprising the steps of:
- a) providing a starting structure comprising at least one layer of a first thermoplastic and two cover layers; wherein said at least one layer of said first thermoplastic comprises a physical blowing agent;
- b) contact heating said starting structure between the press plates of the press to a foaming temperature while maintaining pressure on the starting structure by the press plates;
- c) at said foaming temperature, foaming of said at least one layer of said first thermoplastic comprising the physical blowing agent by moving the press plates a predetermined distance apart, while maintaining a pressure on the structure being foamed, wherein the volume is made to increase to a final volume and then kept constant, thereby obtaining said sandwich panel;
- d) initially cooling of said sandwich panel at a constant final volume while pressurized in contact with the press plates to a temperature below the glass transition temperature of the first thermoplastic comprising the physical blowing agent, such as 20-40° C. above the boiling point of physical blowing agent, by conversion of hot pressurized water in the press plates into steam;
- e) final cooling of the initially cooled sandwich panel of step d); and
- f) opening of the press and removing the sandwich panel cooled in step e) from the press.

The physical blowing agent in the first thermoplastic reduces the glass transition temperature of the first thermoplastic. In the above step d) the glass transition temperature is that of the first thermoplastic including the physical blowing agent. As a guideline the end temperature of the initially cooling step can be set some tens of degrees Celsius, such as in the range of 20-40° C., above the boiling point of the physical blowing agent.

The invention also relates to a method for manufacturing a sandwich panel in a press having press plates, which sandwich panel comprises at least one foam layer of a first thermoplastic and cover layers, the method comprising the steps of:
- a) providing a starting structure comprising at least one layer of a first thermoplastic and two cover layers; wherein said at least one layer of said first thermoplastic comprises a chemical blowing agent having a decomposition temperature above the melting temperature or melting range of the first thermoplastic;
- b) contact heating said starting structure between the press plates of the press to a temperature above the decomposition temperature of the chemical blowing agent so that decomposition of the chemical blowing agent occurs, thereby obtaining an intermediate structure wherein the decomposed chemical blowing agent is present in the at least one layer of the first thermoplastic while maintaining pressure on the starting structure by the press plates;
- c) subsequent to the decomposition of the chemical blowing agent cooling of the intermediate structure thus obtained to a foaming temperature by conversion of hot pressurized water in the press plates into steam, while maintaining pressure on the intermediate structure by the press plates;
- d) at said foaming temperature, foaming of said at least one layer of said first thermoplastic comprising the decomposed chemical blowing agent by moving the press plates a predetermined distance apart, while maintaining a pressure on the structure being foamed, wherein the volume is made to increase to a final volume and then kept constant, thereby obtaining said sandwich panel;
- e) further cooling of said sandwich panel at a constant final volume while pressurized in contact with the press plates to a temperature below the glass transition temperature or the melting temperature or range of the first thermoplastic by conversion of hot pressurized water in the press plates into steam;
- f) final cooling of the sandwich panel of step e); and
- g) opening of the press and removing sandwich panel cooled in step f) from the press.

The methods according to the invention, wherein at least a stage of the cooling after foaming is performed by conversion of hot pressurized water into steam, offers the same advantages as the press outlined above. The various advantageous and preferred embodiments of the press are applicable to the method in a similar way, including condensing of steam in a condenser for recovery of heat.

In case of chemical blowing agents, the foaming temperature is above the glass transition temperatures for amorphous thermoplastics and above the melting point or range for (semi) crystalline thermoplastics.

Foaming occurs under controlled pressure contact with the starting structure by the press plates, that move away from each other. During foaming the volume of the structure is made to increase to a final volume, in particular a final thickness, and then kept constant, thereby obtaining said sandwich panel. Due to the difference between the operating temperature of the foaming step and the final low temperature (typically ambient temperature) a temperature dependent volume reduction (shrinkage) may occur. At any rate, no further expansion occurs. As explained above, the cooling step using phase transformation may be partially performed under reduced pressure.

The invention is further illustrated by the attached drawing, wherein

Figure 2:
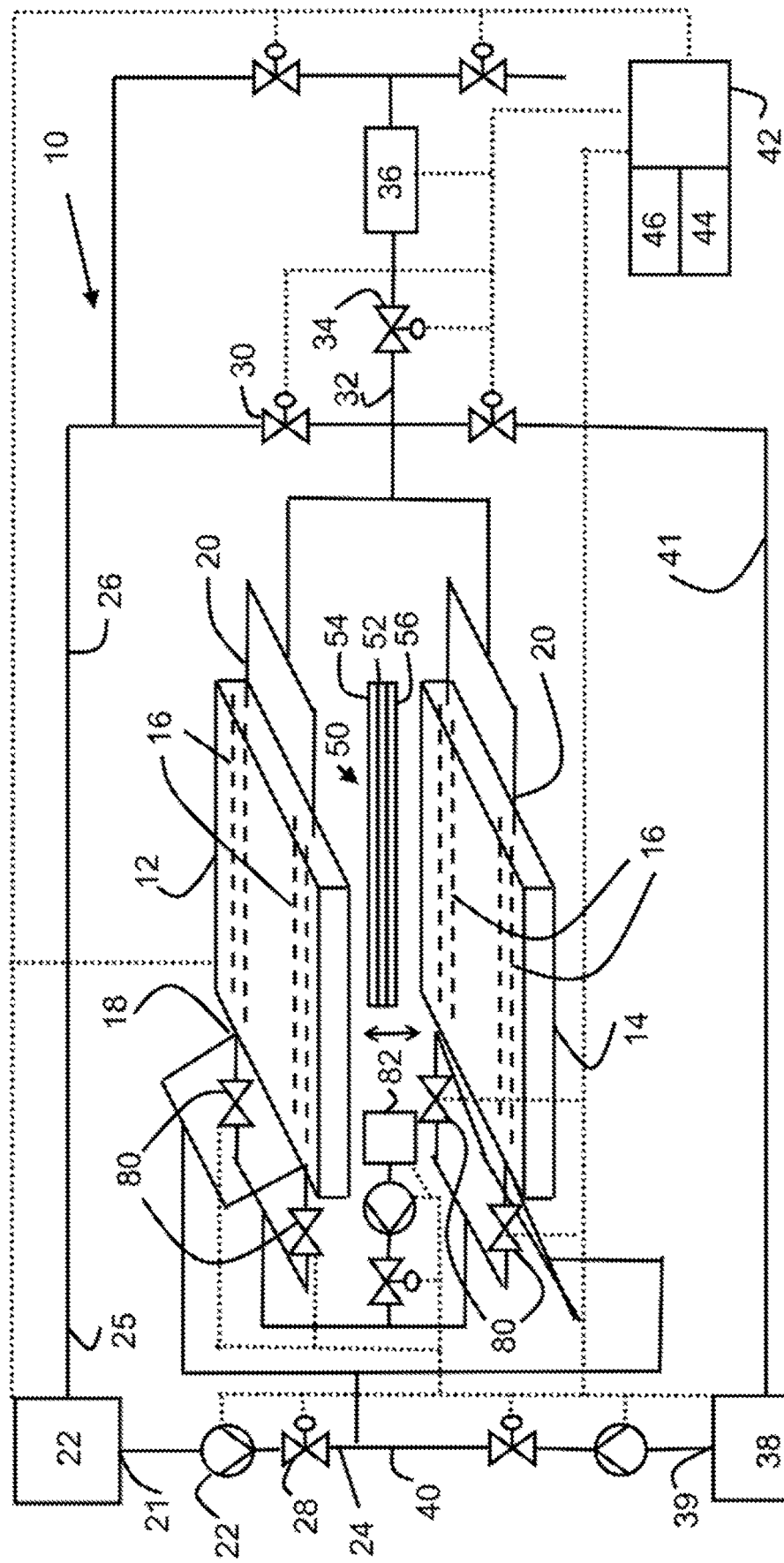

FIG. 1 is a schematic representation of a first embodiment according to the invention; and FIG. 2 is a schematic representation of a second embodiment according to the invention.

In the figures similar components and parts are indicated by the same reference numerals. In FIG. 1 an embodiment of a press for manufacturing a sandwich panel is indicated in its entirety by reference numeral 10. The press 10 comprises two press plates 12 and 14 respectively, that can be displaced with respect to each other. E.g. the lower press plate 14 may have a fixed position, while the upper press plate 12 is vertically displaceable—as indicated by an arrow—e.g. by a hydraulic cylinder (not shown). Each press plate 12, 14 has at least one internal flow channel 16 in its body, which extends from an inlet 18 to an outlet 20. Typically a number of internal flow channels are distributed in the body without impairing the press plate strength beyond a critical value in relation to the pressures to be exerted during operation. The inlet 18 is connected to outlet 21 of a heater 22 by means of fluid supply line 24. The heater 22 is configured to deliver pressurized hot water, e.g. using a boiler and pump (not separately shown). The outlet 20 is connected to the inlet 25 of the heater 22 via a fluid return line 26. Together the heater 22, the fluid supply line 24, internal flow channels 16 and fluid return line 26 are in fluid communication with each other and form a circulation loop used for supplying heat to the press plates. Appropriate valves 28 and 30 are provided in the fluid supply line 24 and fluid return line 26. As schematically shown in this embodiment the fluid return line 26 has a branch line 32 provided with an expansion valve 34 allowing to relief pressure and thereby generating steam from the pressurized hot water present in the flow channels 16 of the press plates 12 and 14, wherein heat used for the conversion of water into steam is withdrawn from the press plates thereby cooling the press plates and as a result the sandwich structure. The steam generated is condensed in condenser 36 for recovery of heat from the steam. The condensate (water) may be returned to the heater 22. A temperature controlled water source 38 having an outlet 39, such as a tap or tank, is in fluid communication with the inlet 18 of the internal flow channel 16 for relatively slow cooling of the respective press plate 12, 14 via a water supply line 40. The outlet 20 is connected to the heater 22, in this case to the fluid return line 26 to make-up for the water lost to the steam generation. Via water return line 41 water may also be cycled back to the water source 38. A control device 42 such as a PC or PLC, having a processor 44 and memory 46 controls the operation of the press 10, including opening and closing thereof, the conditions like temperature, pressure and flow rates of the supplied hot pressurized water, steam for (pre-)heating and initial cooling and of the temperature controlled water for further cooling and the associated equipment, like heater(s), control valves, expansion valves and venturi injectors.

A starting structure (shown two-dimensionally) is indicated by reference numeral 50 and comprises a core layer 52 between skins 54 and 56. In this embodiment the core layer 52 is composed of a thermoplastic comprising a physical blowing agent. The skins 54 and 56 are advantageously glass-fibre reinforced thermoplastic layers, wherein preferably the thermoplastic is the same as the one in the core layer 52.

The starting structure 50 is placed on the pre-heated lower press plate 14 in a fitting manner at its periphery, such that lateral (horizontal) expansion/foaming is prevented. The press plates 12 and 14 have been preheated to the foaming temperature, depending on the thermoplastic used, such as in the range of 170-190° C. The press 10 is closed such that both press plates 12 and 14 contact the starting structure 50. Closing of the press is performed fast in order to prevent premature and uncontrolled foaming of the core layer 52 before pressure is applied by the press plates 12, 14. When a homogeneous foaming temperature (above the boiling temperature of the physical blowing agent9 ) of the starting structure 50 is obtained, the distance between the press plates 12, 14 is increased in a controlled manner, such that the skins 54, 56 maintain their contact with the respective press plate 12, 14 and thus pressure is exerted. Once the distance has increased to a predetermined value thereof and thus the starting structure, in particular the core layer thereof, has foamed to the corresponding predetermined thickness, flow of hot pressurized water through the flow channels 16 is interrupted and cooling is started by operating the expansion valve 34 and cooling is continued until a predetermined lower temperature, such as in the range of 110-150° C., has been achieved. At this temperature the effect of cooling by conversion into steam is less eminent and subsequent cooling of the press plates 12, 14 is performed by water from water source 38 with a controlled temperature in the range of 40-90° C. in order to cool to the sandwich panel to a temperature around 80-95° C. at which foaming does not occur anymore.

Further cooling down to ambient temperature can be performed in the press 10 by circulating water derived from source 38 having a lower controlled temperature through the press plates 12, 14.

In case of a chemical blowing agent the press is heated to a temperature above the decomposition temperature of the chemical blowing agent.

Typically the press plates 12 and 14 are pre-heated to a temperature well above the melt temperature or melting range of the thermoplastic used and above the decomposition temperature of the chemical blowing agent. Alternatively the press plates 12 and 14 are pre-heated to a temperature below the melting point of the thermoplastic to be foamed and thus also below the decomposition temperature of the chemical blowing agent, which is higher than said melting temperature. After closing the press 10 the temperature of the starting structure is further raised by heating the press plates 12, 14 to a temperature above the decomposition temperature. After decomposition of the blowing agent, the structure is quickly cooled to an appropriate temperature above the melting point/range of the thermoplastic by interrupting the flow of hot pressurized water through the flow channels 16 and cooling is started by operating the expansion valve 34 and cooling is continued until the predetermined lower temperature above the melting temperature of the thermoplastic is reached. When the starting structure still under pressure has reached a homogeneous temperature just above the melting temperature of the used thermoplastic in the core layer, the distance between the press plates 12, 14 is increased in a controlled manner, such that the skins 54, 56 maintain their contact with the respective press plate 12, 14 and thus pressure is exerted. Once the distance has increased to a predetermined value thereof and thus the starting structure, in particular the core layer thereof, has foamed to the corresponding predetermined thickness, cooling is re-started by operating the expansion valve 34 and cooling is continued as explained hereinabove.

The intermediate cooling from the decomposition temperature to the melting temperature of the thermoplastic may be omitted. Then foaming is performed at a relatively high foaming temperature.

FIG. 2 shows a second embodiment of a press according to the invention, which is similar to that of FIG. 1, except that the heater 22 is configured for generating steam and the press 10 is heated by steam. In order to fill the internal flow channels 16 with hot pressurized water prior to cooling, a venturi-connection 80 between a further hot pressurized water source 82 and the inlet 18 is provided, typically at each inlet of an internal flow channel 16.

In FIG. 1 a vacuum pump 90 controlled by the control device 42 is via conduits provided with control valves, fluidly connected to the flow channels 16, which pump 90 can be operated to reduce the pressure the internal flow channels 16, if appropriate. This arrangement can also be incorporated in the embodiment of FIG. 2.

The invention claimed is:

1. Press for manufacturing a sandwich panel, comprising a first and second press plate that are configured to be movable with respect to one another, the press having a fluid circulation loop for heating and cooling the press plates,
wherein the fluid circulation loop comprises
a heater for generating a heated fluid having an outlet connected to a fluid supply conduit, and an inlet connected to a fluid return conduit, wherein the fluid supply conduit is in fluid communication with an inlet of at least one internal flow channel in each press plate and the fluid return conduit is in fluid communication with an outlet of the at least one internal flow channel of each press plate, wherein the fluid circulation loop is provided with a controlled expansion valve configured for conversion of hot pressurized water into steam for cooling the press plates, and a water source of which the outlet is in fluid communication with the inlet of the at least one internal flow channel of each press plate via a water supply conduit.

2. The press according to claim 1, wherein the heater is configured for generating hot pressurized water.

3. The press according to claim 1, wherein the heater is configured for generating steam, and the fluid circulation loop is provided with a venturi connection connected to a hot water source for introducing hot pressurized water into the at least one internal flow channel of each press plate.

4. The press according to claim 1, wherein the controlled expansion valve is connected to a condenser for recovery of heat from steam.

5. The press according to claim 1, further comprising a water return conduit between the outlet of the at least one internal flow channel of each press plate and the water source.

6. The claim 1, further comprising a controller comprising a processor and a memory storing computer-readable instructions which, when executed by the processor, perform processes, including:
  pre-heating the press plates by flowing a hot fluid through the fluid circulation loop;
  closing the press by moving the pre-heated press plates towards one another and exerting a pressure on a starting structure of the sandwich panel to be manufactured;
  continuing heating the press plates by flowing a hot fluid through the fluid circulation loop thereby heating the starting structure to the foaming temperature, while exerting a pressure on the starting structure;
  foaming the starting structure at the foaming temperature by moving the press plates a predetermined distance apart, while maintaining a pressure on the structure being foamed;
  interrupting the flow of hot fluid through the fluid circulation loop;
  cooling the press plates by actuating the controlled expansion valve thereby converting hot pressurized water into steam; and
  cooling the press plates by flowing water having a controlled temperature through the internal flow channels of the press plates.

7. The press according to claim 6, wherein the computer-readable instructions also comprise opening of the press for removal of the finished sandwich panel.

8. The press according to claim 1, further comprising a vacuum pump connected to the flow channels for additional pressure reduction.

9. Method for manufacturing a sandwich panel in a press having press plates, which sandwich structure comprises at least one foam layer of a first thermoplastic and cover layers, the method comprising the steps of:
  a) providing a starting structure comprising at least one layer of a first thermoplastic and two cover layers; wherein said at least one layer of said first thermoplastic comprises a physical blowing agent;
  b) contact heating said starting structure between the press plates of the press to a foaming temperature while maintaining pressure on the starting structure by the press plates;
  c) at said foaming temperature, foaming of said at least one layer of said first thermoplastic comprising the physical blowing agent by moving the press plates a predetermined distance apart, while maintaining a pressure on the structure being foamed, wherein the volume is made to increase to a final volume and then kept constant, thereby obtaining said sandwich panel;
  d) initially cooling of said sandwich panel at a constant final volume while pressurized in contact with the press plates to a temperature below the glass transition temperature of the first thermoplastic comprising the physical blowing agent by conversion of hot pressurized water in the press plates into steam by means of a controlled expansion valve;
  e) final cooling of the initially cooled sandwich panel of step d); and
  f) opening of the press and removing the cooled sandwich panel of step e) from the press.

10. Method for manufacturing a sandwich panel in a press having press plates, which sandwich panel comprises at least one foam layer of a first thermoplastic and cover layers, the method comprising the steps of:
  a) providing a starting structure comprising at least one layer of a first thermoplastic and two cover layers; wherein said at least one layer of said first thermoplastic comprises a chemical blowing agent having a decomposition temperature above the melting temperature or melting range of the first thermoplastic;
  b) contact heating said starting structure between the press plates of the press to a temperature above the decomposition temperature of the chemical blowing agent so that decomposition of the chemical blowing agent occurs, thereby obtaining an intermediate structure wherein the decomposed chemical blowing agent is present in the at least one layer of the first thermoplastic while maintaining pressure on the starting structure by the press plates;
  c) subsequent to the decomposition of the chemical blowing agent cooling of the intermediate structure thus obtained to a foaming temperature by conversion of hot pressurized water in the press plates into steam by means of a controlled expansion valve, while maintaining pressure on the intermediate structure by the press plates;
  d) at said foaming temperature, foaming of said at least one layer of said first thermoplastic comprising the decomposed chemical blowing agent by moving the press plates a predetermined distance apart, while exerting a pressure on the structure being foamed, wherein the volume is made to increase to a final volume and then kept constant, thereby obtaining said sandwich panel;
  e) further cooling of said sandwich panel at a constant final volume while pressurized in contact with the press plates to a temperature below the glass transition temperature or melting temperature or range of the first thermoplastic by conversion of hot pressurized water in the press plates into steam by means of a controlled expansion valve;
  f) final cooling of the sandwich panel of step e); and
  g) opening of the press and removing sandwich panel cooled in step f) from the press.

11. The method according to claim 9, wherein a cooling step by conversion of hot pressurized water into steam is performed under reduced pressure.

12. The method according to claim 10, wherein a cooling step by conversion of hot pressurized water into steam is performed under reduced pressure.

13. The press according to claim 2, wherein the controlled expansion valve is connected to a condenser for recovery of heat from steam.

14. The press according to claim 3, wherein the controlled expansion valve is connected to a condenser for recovery of heat from steam.

15. The press according to claim 2, further comprising a water return conduit between the outlet of the at least one internal flow channel of each press plate and the water source.

16. The press according to claim 3, further comprising a water return conduit between the outlet of the at least one internal flow channel of each press plate and the water source.

17. The press according to claim 4, further comprising a water return conduit between the outlet of the at least one internal flow channel of each press plate and the water source.

18. The press according to claim 2, further comprising a vacuum pump connected to the flow channels for additional pressure reduction.

19. The press according to claim 3, further comprising a vacuum pump connected to the flow channels for additional pressure reduction.

20. The press according to claim 4, further comprising a vacuum pump connected to the flow channels for additional pressure reduction.

\* \* \* \* \*